United States Patent
Sohn

(10) Patent No.: US 8,552,683 B2
(45) Date of Patent: Oct. 8, 2013

(54) CHARGING APPARATUS

(75) Inventor: Kwon Sohn, Yongin-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 482 days.

(21) Appl. No.: 12/926,731

(22) Filed: Dec. 7, 2010

(65) Prior Publication Data

US 2011/0304297 A1 Dec. 15, 2011

(30) Foreign Application Priority Data

Jun. 10, 2010 (KR) ........................ 10-2010-0054972

(51) Int. Cl.
*H02J 7/35* (2006.01)
*H01M 2/10* (2006.01)

(52) U.S. Cl.
USPC ........... 320/107; 320/150; 320/101; 320/104; 320/114; 429/97; 429/99; 429/98

(58) Field of Classification Search
USPC ....................................................... 320/107
See application file for complete search history.

(56) References Cited

U.S. PATENT DOCUMENTS

| | | | | |
|---|---|---|---|---|
| 5,569,552 A | * | 10/1996 | Rao et al. | 429/72 |
| 5,704,212 A | * | 1/1998 | Erler et al. | 62/3.2 |
| 5,985,483 A | * | 11/1999 | Verhoog et al. | 429/120 |
| 6,057,050 A | * | 5/2000 | Parise | 429/7 |
| 6,404,163 B1 | * | 6/2002 | Kapsokavathis et al. | 320/104 |
| 6,479,185 B1 | * | 11/2002 | Hilderbrand et al. | 429/148 |
| 6,645,666 B1 | | 11/2003 | Moores, Jr. et al. | |
| 7,427,156 B2 | * | 9/2008 | Ambrosio et al. | 374/20 |
| 7,875,378 B2 | | 1/2011 | Yang et al. | |
| 2006/0113965 A1 | | 6/2006 | Jeon et al. | |
| 2009/0325052 A1 | | 12/2009 | Koetting et al. | |

FOREIGN PATENT DOCUMENTS

| | | |
|---|---|---|
| JP | 11-238530 A | 8/1999 |
| JP | 11-288744 A | 10/1999 |
| JP | 2005-005162 A | 1/2005 |
| JP | 2009-529217 A | 8/2009 |
| KR | 10 2006-0086120 A | 7/2006 |
| KR | 10 2006-0103630 A | 10/2006 |
| KR | 10-2010-0003135 | 1/2010 |

OTHER PUBLICATIONS

Korean Office Action in KR 10-2010-0054972, dated Oct. 19, 2011 (Sohn).

* cited by examiner

*Primary Examiner* — Yalkew Fantu
(74) *Attorney, Agent, or Firm* — Lee & Morse, P.C.

(57) ABSTRACT

A charging apparatus for electrical connection with a charging supply for charging a battery module, the charging apparatus including a coolant pipe, the coolant pipe providing a passage for a cooling medium and surrounding a space for accommodating the battery module; a charging terminal for electrically connecting with the charging power supply; and a chiller connected with the coolant pipe, the chiller being configured to circulate and cool the cooling medium.

19 Claims, 10 Drawing Sheets

CHARGING APPARATUS

BACKGROUND

1. Field

Embodiments relate to a charging apparatus, and more particularly, to a charging apparatus that is capable of performing a cooling function.

2. Description of the Related Art

Rechargeable batteries may be charged and discharged, unlike primary batteries, which cannot be recharged. Low-capacity rechargeable batteries may be used for portable compact electronic apparatuses, e.g., mobile phones or notebook computers and camcorders. High-capacity rechargeable batteries may be used as a power source for, e.g., driving a motor of a hybrid vehicle, etc.

Recently, a high-output rechargeable battery using a non-aqueous electrolyte and having high energy density has been developed. The high-output rechargeable battery is configured with a high-capacity rechargeable battery by connecting a plurality of rechargeable batteries in series so as to be used for driving a motor for an apparatus requiring a large power, e.g., an electrical vehicle, etc.

Further, one high-capacity battery module may generally be constituted by a plurality of rechargeable batteries that are connected with each other in series. The rechargeable batteries may have, e.g., a cylindrical shape, a prismatic shape, etc.

The rechargeable batteries generate heat while being charged. Furthermore, the rechargeable batteries may be overheated while being rapidly charged. When external air is blown in order to cool a battery module, external dust or impurities may be introduced into the battery module and may cause, e.g., a short-circuit or a failure.

The above information disclosed in this Background section is only for enhancement of understanding of the background of the invention and therefore it may contain information that does not form the prior art that is already known in this country to a person of ordinary skill in the art.

SUMMARY

Embodiments are directed to a charging apparatus, which represents advances over the related art.

At least one of the above and other features and advantages may be realized by providing a charging apparatus for electrical connection with a charging supply for charging a battery module, the charging apparatus including a coolant pipe, the coolant pipe providing a passage for a cooling medium and surrounding a space for accommodating the battery module; a charging terminal for electrically connecting with the charging power supply; and a chiller connected with the coolant pipe, the chiller being configured to circulate and cool the cooling medium.

The apparatus may further include a housing, the housing including a mounting groove for accommodating the battery module.

The coolant pipe may be in a wall of the housing.

The housing may be configured to contact the battery module and to cool the battery module by conduction.

The charging terminal may extend into the mounting groove, the charging terminal being detachably engagable with a terminal of the battery module.

The coolant pipe may extend in a circumferential direction around the mounting groove.

The coolant pipe may extend in a height direction of the mounting groove, and ends of the coolant pipe may be reciprocally connected with each other to be disposed in a zigzag pattern.

A plurality of housings are connected to a single chiller.

The mounting groove may include a temperature sensor therein, and the temperature sensor may be connected with a controller, the controller being configured to control flow velocity and temperature of the cooling medium.

An inner surface of the mounting groove may include a heat transfer layer thereon, the heat transfer layer including a material having thermal conductivity as well as having an elasticity greater than an elasticity of the housing.

The apparatus may further include a controller detachably connectable with a battery management system (BMS) in the battery module, the BMS being configured to control the battery module and the controller being configured to control flow velocity and temperature of the cooling medium.

The coolant pipe may be spirally wound.

The apparatus may further include a support member fixed to the coolant pipe, the support member extending in a stacking direction of the coolant pipe to support a shape of the coolant pipe.

The coolant pipe may be configured to contact the battery module and to cool the battery module by conduction.

At least one of the above and other features and advantages may also be realized by providing a charging apparatus for electrical connection with a charging power supply for charging a battery module, the charging apparatus including a housing, the housing including a mounting groove for accommodating the battery module and a coolant passage for providing a passage for a coolant, the coolant passage being associated with a wall of the housing; a charging terminal on the housing and electrically connected with a charging power supply; and a chiller connected with the coolant passage, the chiller being configured to circulate and cool the coolant.

The housing may include an inner wall defining the mounting groove and an outer wall spaced from the inner wall, the outer wall forming an exterior of the housing, and the coolant passage may be between the inner wall and the outer wall.

The coolant passage may extend in a circumferential direction around the housing.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
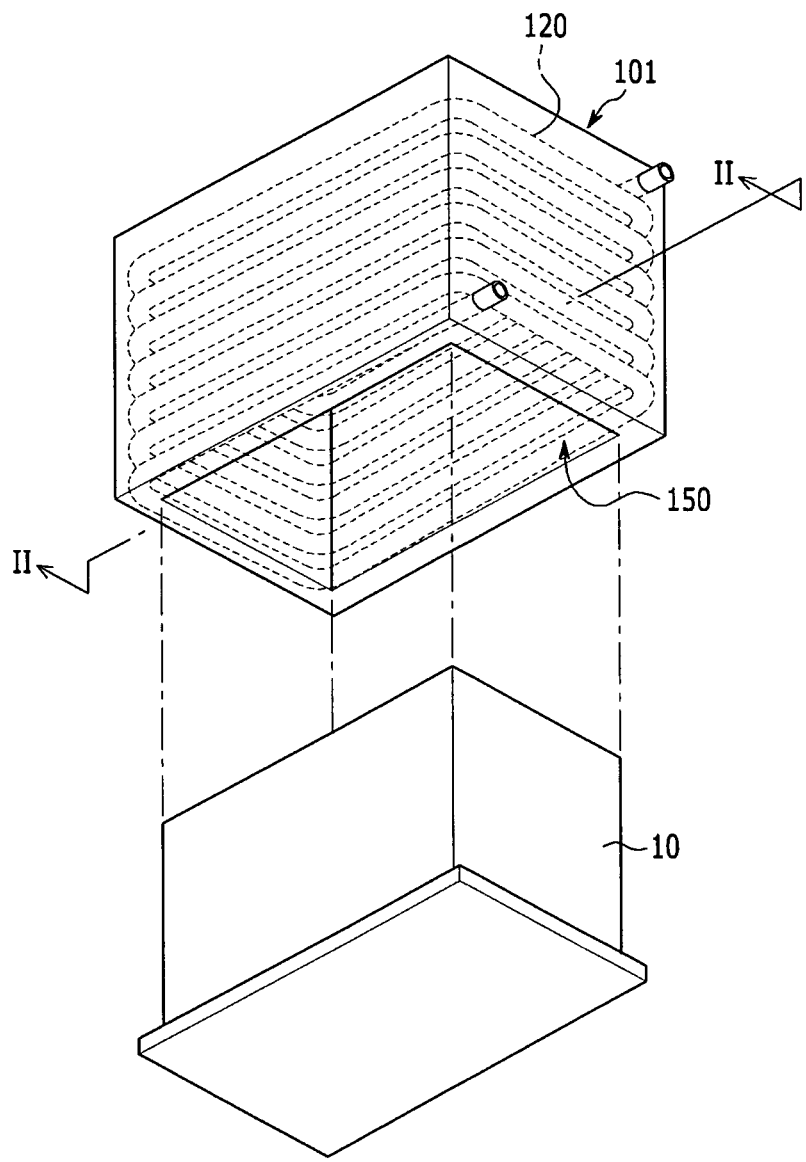
FIG. 1 illustrates an exploded perspective view of a charging apparatus and a battery module according to an embodiment.

Korean Patent Application No. 10-2010-0054972, filed on Jun. 10, 2010, in the Korean Intellectual Property Office, and entitled: "Charging Apparatus," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
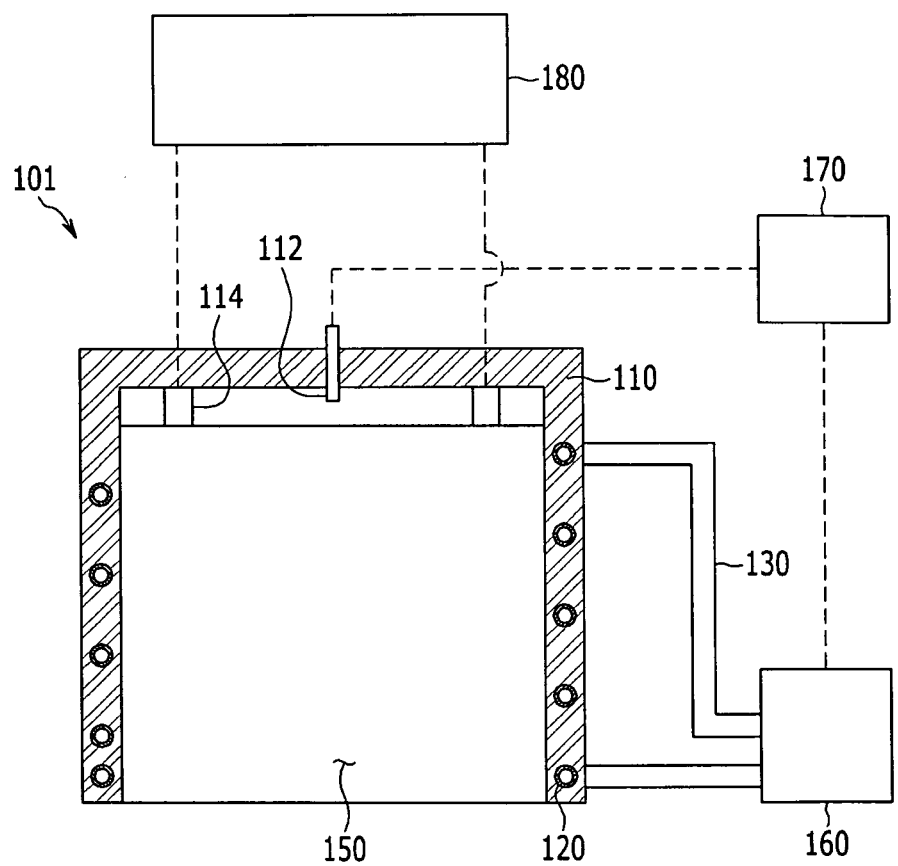
FIG. 2 illustrates a cross-sectional view taken along line II-II of FIG. 1.

FIG. 1 illustrates a perspective view of a rechargeable battery according to an embodiment. FIG. 2 illustrates a longitudinal cross-sectional view taken along line II-II of FIG. 1.

Referring to FIGS. 1 and 2, the charging apparatus according to the present embodiment may include a housing 110 having a mounting groove 150 therein. A battery module 10 may be mounted in the mounting groove 150, i.e., the battery module 10 may be accommodated in the mounting groove 150. The charging apparatus may further include a coolant pipe 120 in the housing 110 as well as a charging terminal 114 electrically connectable with the battery module 10.

The battery module 10 may include a pack including an exterior as well as a plurality of rechargeable batteries in the pack. The rechargeable batteries may be, e.g., cylindrical or angular batteries. The structure of the battery module 10 is not particularly limited; and the charging apparatus 101 according to the present embodiment may be used to charge various kinds of battery modules.

The housing 110 may have a substantially rectangular parallelepiped shape and may have a structure in which the mounting groove 150 is formed. For example, mounting groove 150 of the housing 110 may have a shape corresponding to a shape of the battery module 10 to be accommodated therein. The housing 110 may be made of, e.g., copper (Cu) or aluminum (Al) having high thermal conductivity. The battery module 10 may be inserted into the mounting groove 150 and, in this case, an inner wall surface of the mounting groove 150 and an outer surface of the battery module 10 may be closely contacted with each other. Thus, heat generated from the battery module 10 may be transferred to the housing 110 by conduction.

The coolant pipe 120 may be disposed in a wall surface of the housing 110 and, in this case, the coolant pipe 120 may be wound in a circumferential direction of or around the mounting groove 150 to surround the mounting groove 150. A coolant passage may be formed in the housing 100 by the coolant pipe 120. The coolant pipe 120 may be made of, e.g., copper, aluminum, and the like, and may provide a passage through which a cooling medium or coolant moves or flows.

Herein, the cooling medium may include, e.g., Freon, CFC, water, ethylene, and the like. Thus, the cooling medium passing through the coolant pipe 120 may cool the housing 110. The cooling medium may be introduced into a chiller 160 connected through a flexible pipe 130. The chiller 160 may cool the cooling medium as well as circulate the cooling medium by using a pump (not illustrated). The chiller 160 may cool the cooling medium by, e.g., removing heat from the cooling medium by compressing and condensing the cooling medium or by directly cooling the cooling medium.

A thermometer or temperature sensor 112 may be installed in the mounting groove 150 to measure temperature in the mounting groove 150. Temperature information may then be delivered to a controller 170. The controller 170 may control operation of the chiller 160 by determining or analyzing temperature information of the mounting groove 150. As a result, when the temperature of the mounting groove 150 increases, the temperature of the cooling medium may be lowered and the circulation speed of the cooling medium may be increased so as to lower or stably maintain the temperature of the battery module 10.

The controller 170 may be connected with a battery management system (BMS) in the battery module 10 to receive information therefrom. The BMS is a system that controls the temperatures of rechargeable batteries as well as controls the charging and discharging of rechargeable batteries installed in the battery module 10. The temperature information of the rechargeable batteries may be stored in the BMS. When the controller 170 is connected with the BMS, the controller 170 may control operation of the chiller 160 by determining and/or analyzing the temperature information stored in the BMS in real time.

Figure 3:
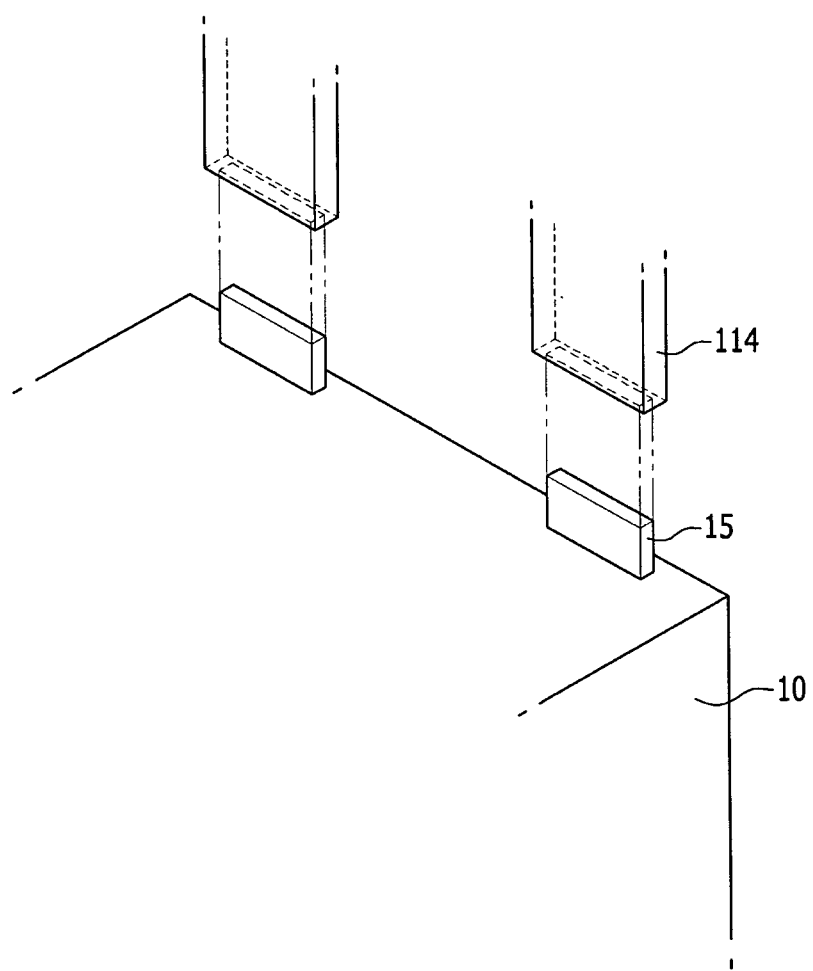
FIG. 3 illustrates a partial perspective view of a charging terminal of a charging apparatus and a terminal of a battery module.

As shown in FIGS. 2 and 3, the charging terminal 114 that is electrically connectable with the battery module 10 may be installed in the mounting groove 150. The charging terminal 114 may be electrically connected with a charging power supply 180 and may protrude on top of the mounting groove 150. A groove may be formed in the charging terminal 114; and a module terminal 15 of the battery module 10 may have a protrusion shape. Thus, the charging terminal 114 and the module terminal 15 of the battery module 10 may engage in each other during charging.

As a result, the module terminal 15 of the battery module 10 and the charging terminal 114 may be coupled with each other while the battery module 10 is accommodated in the mounting groove 150.

As such, according to the present embodiment, after the battery module 10 is inserted into the housing 110, the battery module 10 may be immediately charged. Since the coolant pipe 120 may be in a wall of the housing 110, it is possible to prevent the battery module 10 from being overheated without use of an additional chiller. Heat generated during charging may be discharged to the housing 110 by conduction; and heat transferred to the housing 110 may be rapidly discharged outside through the cooling medium. In an implementation, the supply temperature of the cooling medium may be about 5° C., which may be markedly lower than the temperature of the battery module 10. Thus, since the temperature of the cooling medium may be low and specific heat of the cooling medium may be high, it is possible to uniformly cool the battery module 10. In contrast to cooling the battery module 10 by blowing external air, contamination and non-uniform cooling of the battery module by the external air, which has a low specific heat, may be prevented. For example, according to the present embodiment, it is possible to uniformly and rapidly cool the battery module 10. In particular, the charging apparatus 101 may be a fast charging apparatus and, as a result, stability of the charging apparatus 101 may be improved by efficiently discharging heat generated during fast charging.

Figure 4:
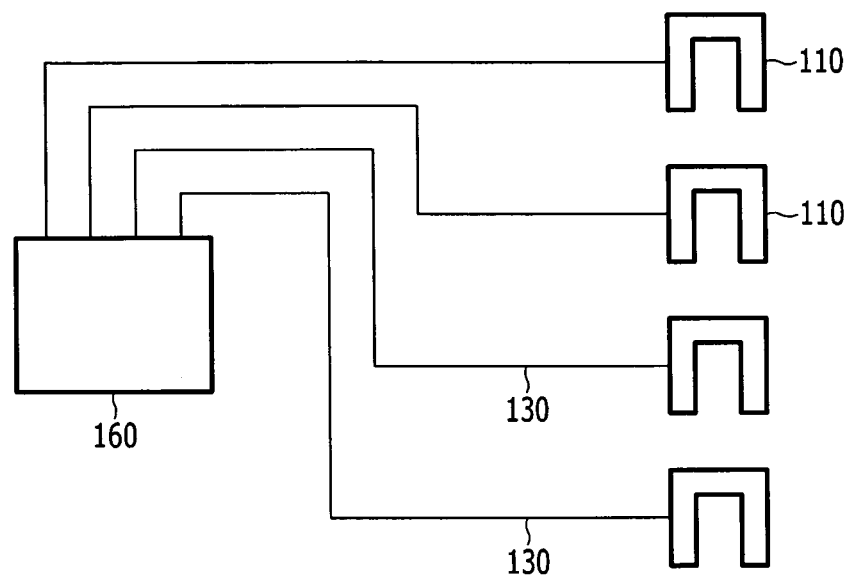
FIG. 4 illustrates a schematic diagram of a charging system according to an embodiment.

FIG. 4 illustrates a schematic diagram of a charging system according to an embodiment. As shown in FIG. 4, the charging system according to the present embodiment may include a charging apparatus including a chiller 160 and a plurality of housings 110 connected thereto. The housing 110 and the chiller 160 may have the same structure as the housing and the chiller of the charging apparatus according to the above-described embodiment.

The housings 110 may be connected with the chiller 160 through a flexible pipe 130 to receive the cooling medium from the chiller 160. The chiller 160 may circulate the cooling medium and may also lower the temperature of, i.e., may cool, the cooling medium. In other words, the chiller 160 may provide the cooling medium to any of the housings 110 where charging is in progress among the plurality of housings 110. As such, according to the present embodiment, since the plurality of housings 110 may be cooled using only one chiller 160, it is possible to more efficiently cool the housings 110.

Figure 5:
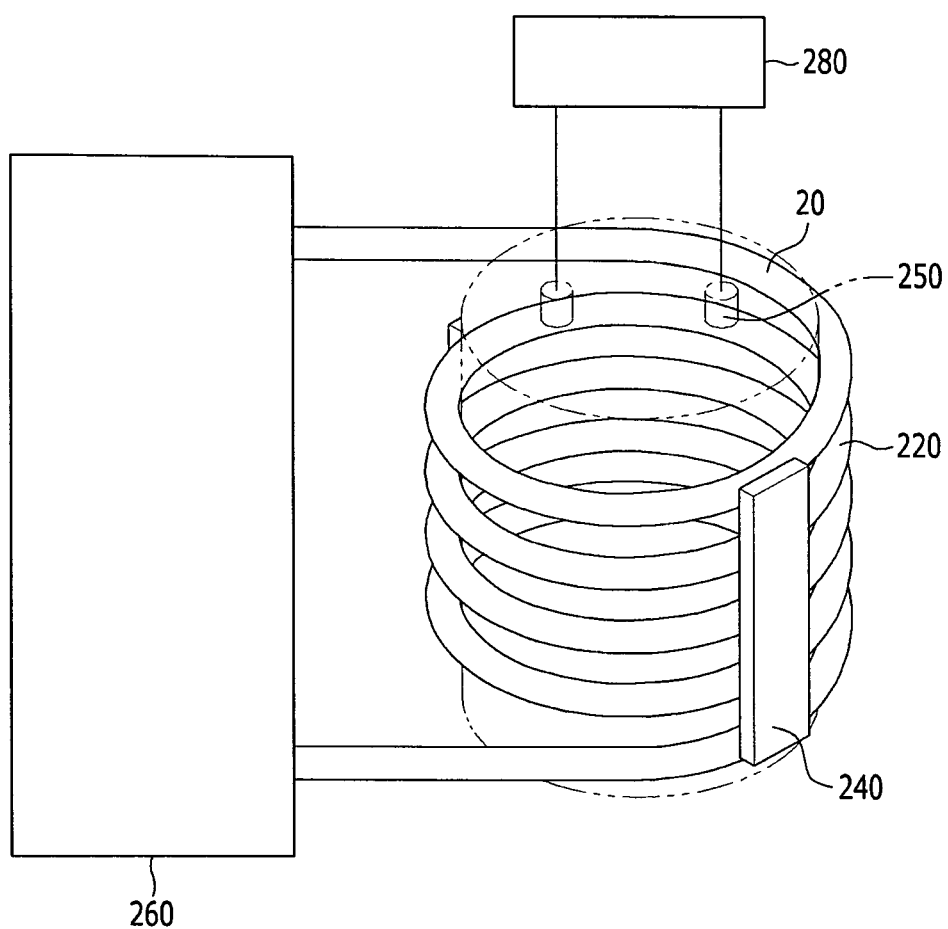
FIG. 5 illustrates a perspective view of a charging apparatus according to another embodiment.

FIG. 5 illustrates a perspective view of a charging apparatus according to another embodiment.

Referring to FIG. 5, the charging apparatus 102 according to the present embodiment may include a coolant pipe 220 covering or surrounding space for accommodating a battery module 20. The charging apparatus 102 may further include a charging terminal 250 electrically connectable with the battery module 20.

The battery module 20 may include a plurality of rechargeable batteries and may have a structure in which the rechargeable batteries are connected to each other in series or in parallel. The battery module 20 according to the present embodiment may have a cylindrical shape. However, the embodiments are not limited thereto.

The coolant pipe 220 may provide a passage through which the cooling medium moves or flows and may be connected with the chiller 260. The chiller 260 may cool and circulate the cooling medium. The coolant pipe 220 may be spirally wound and may form or define a space therein for accommodating the battery module 20. The battery module 20 may be inserted into the space surrounded by the coolant pipe 220 and may closely contact the coolant pipe 220.

A support member 240 may be fixed to the coolant pipe 220 to support the shape of the coolant pipe 220. The support member 240 may have, e.g., a bar shape, and may extend in a stacking direction of the coolant pipes 220 to be fixed to the coolant pipe 220 that are, e.g., spirally wound and/or spaced from each other. However, the embodiments are not limited thereto; and the support member 240 may have various structures to maintain the shape of the coolant pipe 220, e.g., a circular pipe shape disposed to surround the circumference of the coolant pipe 220. Two support members 240 may vertically extend and may be fixed to the coolant pipe 220 and face each other.

The charging terminal 250 may be electrically connected with a charging power supply 280 and may be disposed on or adjacent to the coolant pipe 220. When the battery module 20 is inserted between the space within the coolant pipe 220, i.e., is accommodated within the space of coolant pipe 220, a terminal of the battery module and the charging terminal 250 may engage in each other such that charging may progress.

Since the battery module 20 may be charged while inserted within the space in the coolant pipe 220, the battery module 20 may stably discharge heat generated during charging. Since the battery module 20 may be exposed to the outside, the battery module 20 may be exposed to external impurities, but since the coolant pipe 220 is in direct contact with the battery module 20, it is possible to improve cooling efficiency and, since a blowing device may not be used, the possibility of contamination may be lowered.

Figure 6:
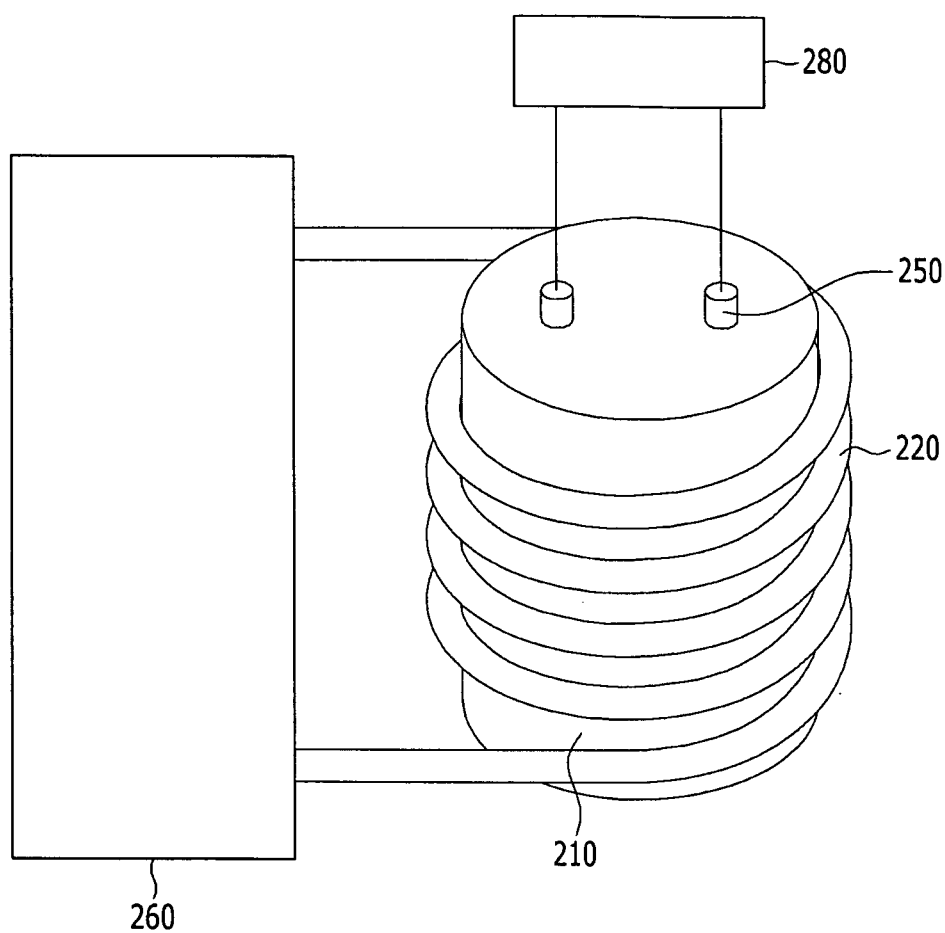
FIG. 6 illustrates a perspective view of a modified example of the charging apparatus of FIG. 5.

FIG. 6 illustrates a perspective view of a modified example of the charging apparatus of FIG. 5.

The charging apparatus 103 according to the modified example of the present embodiment has a similar structure as the charging apparatus described above except that the housing 210 may be installed in, i.e., may be accommodated in a space defined by, the coolant pipe 220.

The housing 210 may be installed inside of, i.e., in the space defined by, the spirally wound coolant pipe 220. The housing 210 may include a mounting groove for accommodating the battery module 20. The housing 210 may have, e.g., a cylindrical shape or a shape corresponding to the shape of the battery module 20, and the coolant pipe 220 may be fixed to and may contact an outer surface of the housing 210. Thus, an additional support member for supporting the shape of the coolant pipe 220 may not be required. In addition, since the battery module 20 may be charged while being accommodated in the housing 210, it is possible to prevent impurities from infiltrating into the battery module 20.

The charging terminal 250 may be electrically connected with the charging power supply 280 and may be installed on the top of the housing 210 to protrude outwardly therefrom. An inner part of the charging terminal 250 may be in communication with an inner part of the housing 210 to be detachably engagable with a terminal of the battery module 20. As a result, when the battery module 20 is inserted into the housing 210, the terminal of the battery module 20 and the charging terminal 250 may engage with each other.

Figure 7:
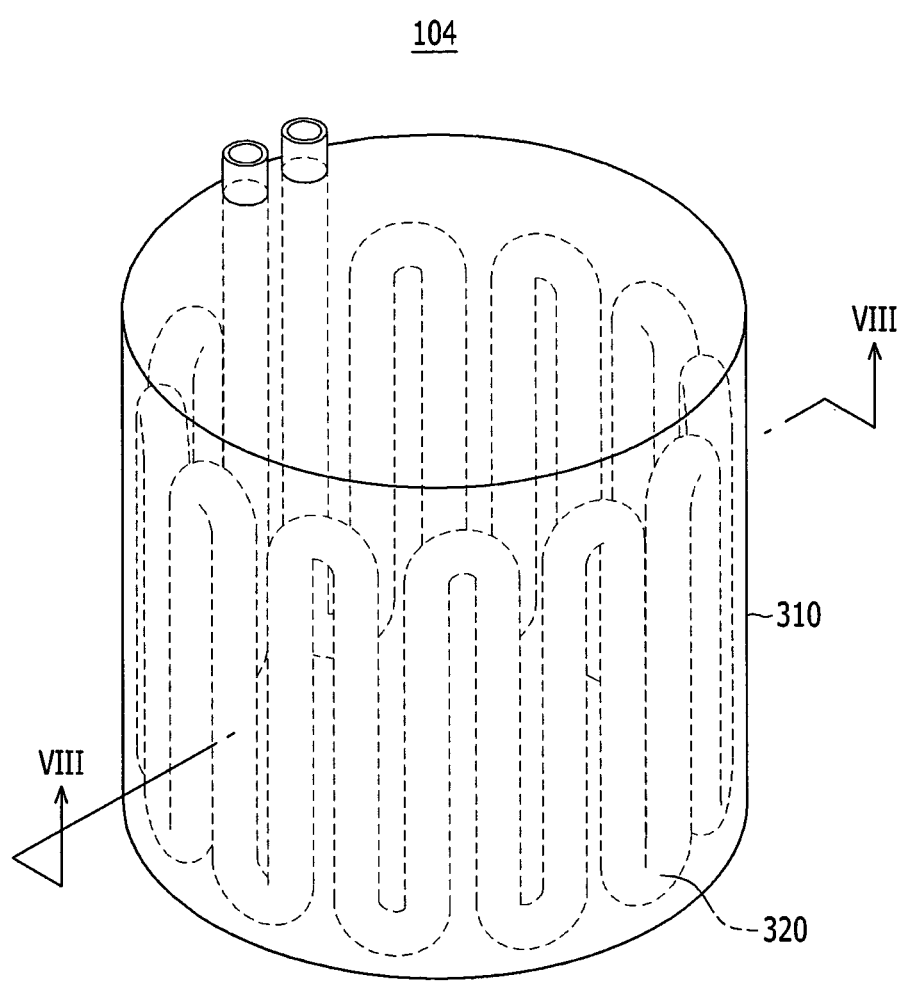
FIG. 7 illustrates a perspective view of a charging apparatus according to still another embodiment.
Figure 8:
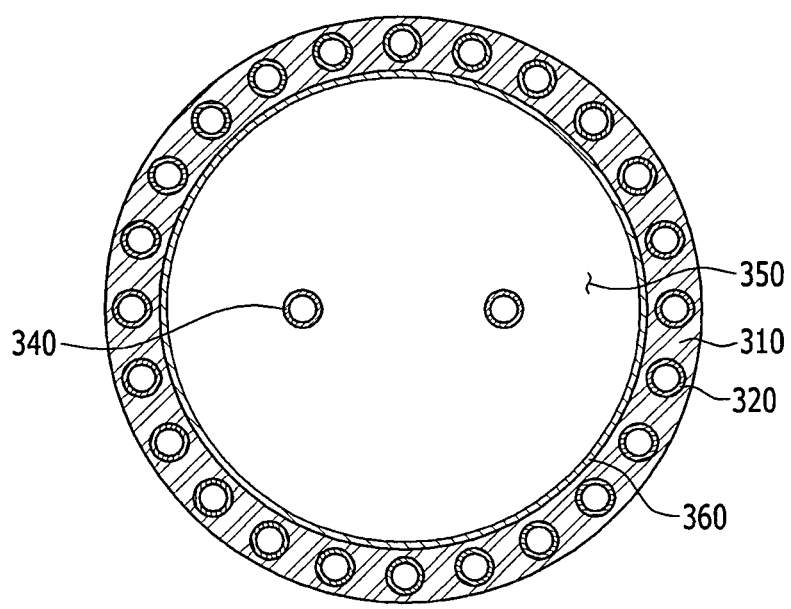
FIG. 8 illustrates a cross-sectional view taken along line VIII-VIII of FIG. 7.

FIG. 7 illustrates a perspective view of a charging apparatus according to another embodiment. FIG. 8 illustrates a cross-sectional view taken along line VIII-VIII of FIG. 7.

Referring to FIGS. 7 and 8, the charging apparatus 104 according to the present embodiment may include a housing 310 having a mounting groove 350 therein. A battery module (not illustrated) may be accommodated in the mounting groove 350 during charging. The charging apparatus 104 may further include a charging terminal 340 electrically connectable with the battery module as well as a coolant pipe 320 installed in the housing 310.

The housing 310 may have, e.g., a substantially cylindrical shape, and the mounting groove 350 may open downwardly therefrom at an inner center of the housing 310. The battery module may be inserted into and accommodated in the mounting groove 350 and, in this case, an inner wall surface of the mounting groove 350 and an outer surface of the battery module may be in close contact with each other so as to transfer heat generated from the battery module to the housing 310 by conduction.

The coolant pipe 320 may be inserted or housed in a wall of the housing 310. The coolant pipe 320 may extend in a height direction of the mounting groove 350 and may be reciprocally connected to be disposed in a zigzag pattern. A cooling medium may move through the coolant pipe 320 to cool the housing 310. In addition, the charging terminal 340 may protrude on a top of the mounting groove 350 and, as a result, the charging terminal 340 and the terminal of the battery module may engage with each other during charging.

A heat transfer layer 360 may be formed on an inner surface of the mounting groove 350. The heat transfer layer 360 may include a material having thermal conductivity and adhesion properties. The heat transfer layer 360 may be applied onto a whole surface of the mounting groove 350 and may be interposed between the battery module and the wall surface of the housing 310.

As described above, the heat transfer layer 360 may include a material having high thermal conductivity and, as a result, the heat transfer layer 360 may have a higher thermal conductivity than the housing 310. Further, the heat transfer layer 360 may include a material having higher elasticity than a wall surface of the housing 310. In an implementation, the heat transfer layer 360 may include, e.g., thermal grease, thermal conductive sheet, thermal compound, or the like. In another implementation, the heat transfer layer 360 may include thermally conductive oil. When the heat transfer layer 360 includes thermal conductive oil, it is possible to easily attach or detach the battery module as well as to improve heat transfer efficiency between the housing 310 and the battery module.

When the coolant pipe 320 disposed in the zigzag pattern is in the wall of the housing 310 of the charging apparatus 104 as described above, it is possible to easily cool the battery module that is being charged. Further, when the heat transfer layer 360 is formed in the mounting groove 350, the heat transfer layer 360 may closely contact the battery module to easily discharge heat generated from the battery module.

Figure 9:
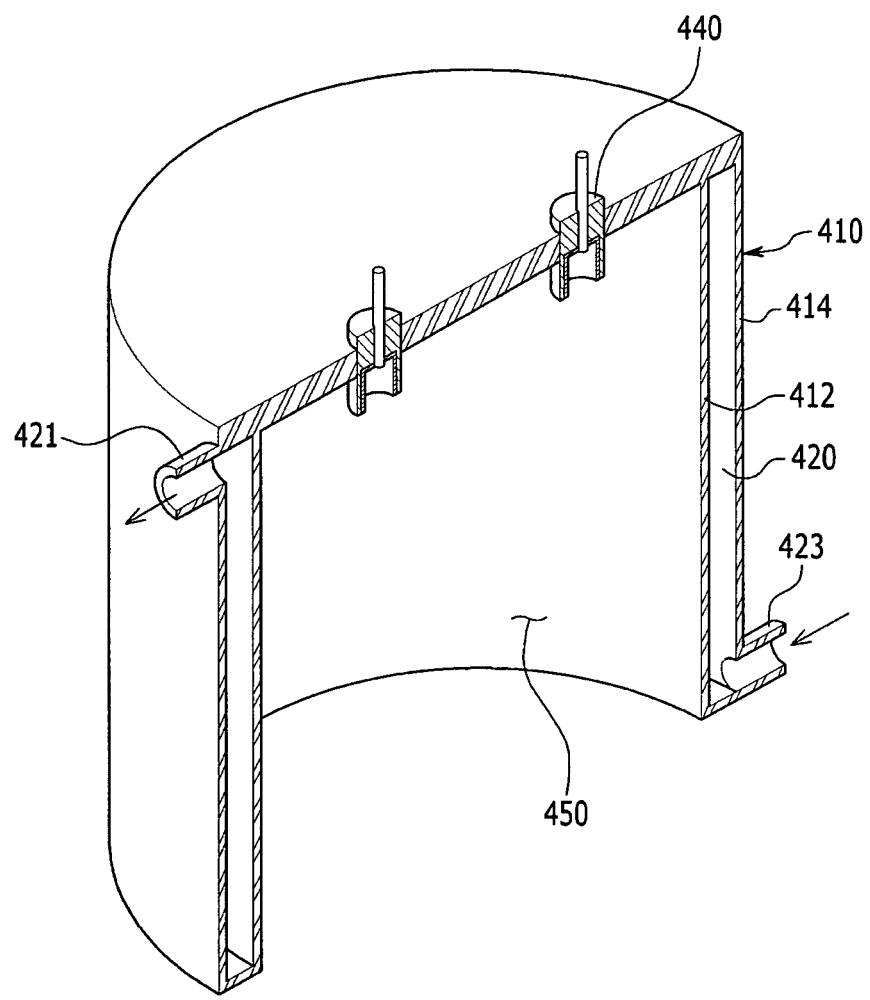
FIG. 9 illustrates a cutaway perspective view of a charging apparatus according to still another embodiment.
Figure 10:
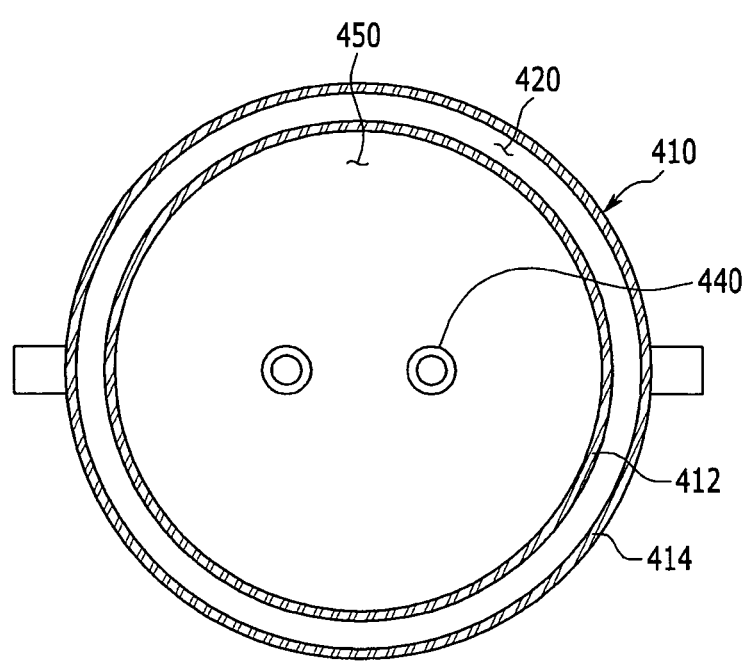
FIG. 10 illustrates a cross-sectional view of the charging apparatus of FIG. 9.

FIG. 9 illustrates a cutaway perspective view of a charging apparatus according to yet another embodiment. FIG. 10 illustrates a cross-sectional view of the charging apparatus of FIG. 9.

Referring to FIG. 9, the charging apparatus 105 according to the present embodiment has the same structure as the charging apparatus according to the previous embodiment except for structures of a housing 410 and a coolant passage 420. Therefore, a repeated description of the same structures will be omitted.

The charging apparatus 105 according to the present embodiment may include a mounting groove 450 for accommodating a battery module (not illustrated). The charging apparatus may also include a housing 410 in which the coolant passage 420 is formed and a charging terminal 440 electrically connectable with the battery module. The housing 410 may have, e.g., a substantially cylindrical shape; and the mounting groove 450 may open downwardly therefrom to accommodate the battery module therein. The charging terminal 440 that is detachably engageable with a terminal of the battery module may be installed on a top of the mounting groove 450.

The housing 410 may include an inner wall 412 that defines the mounting groove 450 and an outer wall 414 that is spaced from the inner wall 412, faces the inner wall 412, and forms an exterior of the housing 410. The coolant passage 420 may be formed between the inner wall 412 and the outer wall 414 so as to facilitate movement a cooling medium or coolant through the coolant passage 420.

The coolant passage 420 may be in communication with an inlet 423 through which the cooling medium may be introduced and an outlet 421 through which the cooling medium may be discharged. The cooling medium heated in the coolant passage 420 may be discharged to a chiller through the outlet 423. The cooling medium cooled by the chiller may be introduced into the coolant passage 420 through the inlet 421 again to cool the housing 410.

According to the present embodiment, since coolant may be exposed to the entire inner wall 412 of the housing 410, it is possible to more rapidly discharge heat generated in the battery module.

The embodiments provide a charging apparatus for stably cooling a rechargeable battery in the process of being charged.

Further, the embodiments provide a charging apparatus having a cooling function, which charging apparatus improves safety by preventing impurities from being introduced during charging and cooling.

In particular, according to the embodiments, since a coolant pipe may be installed in a charging apparatus, it is possible to efficiently discharge heat generated while charging by directly cooling a battery module through conduction. Further, since an need for direct blowing of air is averted, it is possible to prevent the battery module from being damaged due to infiltration of external impurities or dust into the battery module.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A charging apparatus for electrical connection with a charging supply for charging a battery module, the charging apparatus comprising:
   a coolant pipe, the coolant pipe providing a passage for a cooling medium and surrounding a space for accommodating the battery module;
   a charging terminal for electrically connecting with the charging power supply; and
   a chiller connected with the coolant pipe, the chiller being configured to circulate and cool the cooling medium.

2. The apparatus as claimed in claim 1, further comprising a housing, the housing including a mounting groove for accommodating the battery module.

3. The apparatus as claimed in claim 2, wherein the coolant pipe is in a wall of the housing.

4. The apparatus as claimed in claim 2, wherein the housing is configured to contact the battery module and to cool the battery module by conduction.

5. The apparatus as claimed in claim 2, wherein the charging terminal extends into the mounting groove, the charging terminal being detachably engageable with a terminal of the battery module.

6. The apparatus as claimed in claim 2, wherein the coolant pipe extends in a circumferential direction around the mounting groove.

7. The apparatus as claimed in claim 2, wherein:
   the coolant pipe extends in a height direction of the mounting groove, and
   ends of the coolant pipe are reciprocally connected with each other to be disposed in a zigzag pattern.

8. The apparatus as claimed in claim 2, wherein a plurality of housings are connected to a single chiller.

9. The apparatus as claimed in claim 2, wherein:
   the mounting groove includes a temperature sensor therein, and
   the temperature sensor is connected with a controller, the controller being configured to control flow velocity and temperature of the cooling medium.

10. The apparatus as claimed in claim 2, wherein an inner surface of the mounting groove includes a heat transfer layer thereon, the heat transfer layer including a material having thermal conductivity as well as having an elasticity greater than an elasticity of the housing.

11. The apparatus as claimed in claim 1, further comprising a controller detachably connectable with a battery management system (BMS) in the battery module, the BMS being configured to control the battery module and the controller being configured to control flow velocity and temperature of the cooling medium.

12. The apparatus as claimed in claim 1, wherein the coolant pipe is spirally wound.

13. The apparatus as claimed in claim 1, further comprising a support member fixed to the coolant pipe, the support member extending in a stacking direction of the coolant pipe to support a shape of the coolant pipe.

14. The apparatus as claimed in claim 1, wherein the coolant pipe is configured to contact the battery module and to cool the battery module by conduction.

15. A charging apparatus for electrical connection with a charging power supply for charging a battery module, the charging apparatus comprising:
- a housing, the housing including a mounting groove for accommodating the battery module and a coolant passage for providing a passage for a coolant, the coolant passage being associated with a wall of the housing;
- a charging terminal on the housing and electrically connected with a charging power supply; and
- a chiller connected with the coolant passage, the chiller being configured to circulate and cool the coolant.

16. The apparatus as claimed in claim 15, wherein:
the housing includes an inner wall defining the mounting groove and an outer wall spaced from the inner wall, the outer wall forming an exterior of the housing, and
the coolant passage is between the inner wall and the outer wall.

17. The apparatus as claimed in claim 15, wherein the coolant passage extends in a circumferential direction around the housing.

18. The apparatus as claimed in claim 15, wherein an inner surface of the mounting groove includes a heat transfer layer thereon, the heat transfer layer including a material having thermal conductivity as well as an elasticity higher than an elasticity of the housing.

19. The apparatus as claimed in claim 15, wherein the heat transfer layer includes thermally conductive oil.

* * * * *